United States Patent
Tseng

(10) Patent No.: US 11,883,812 B2
(45) Date of Patent: Jan. 30, 2024

(54) METHOD AND APPARATUS FOR REGENERATING DEACTIVATED DENITRATION CATALYST

(71) Applicant: TAIWAN POWER COMPANY, Taipei (TW)

(72) Inventor: Chih-Fu Tseng, New Taipei (TW)

(73) Assignee: TAIWAN POWER COMPANY, Taipei (TW)

( * ) Notice: Subject to any disclaimer, the term of this patent is extended or adjusted under 35 U.S.C. 154(b) by 360 days.

(21) Appl. No.: 17/108,303

(22) Filed: Dec. 1, 2020

(65) Prior Publication Data
US 2022/0080401 A1 Mar. 17, 2022

(30) Foreign Application Priority Data
Sep. 16, 2020 (TW) .................. 109131906

(51) Int. Cl.
| | |
|---|---|
| *B01J 38/66* | (2006.01) |
| *B01J 19/00* | (2006.01) |
| *B01D 53/86* | (2006.01) |
| *B01D 53/96* | (2006.01) |
| *B01J 19/10* | (2006.01) |
| *B01J 38/48* | (2006.01) |
| *B01J 38/68* | (2006.01) |

(52) U.S. Cl.
CPC .......... *B01J 38/66* (2013.01); *B01D 53/8628* (2013.01); *B01D 53/96* (2013.01); *B01J 19/0053* (2013.01); *B01J 19/10* (2013.01); *B01J 38/48* (2013.01); *B01J 38/68* (2013.01); *B01D 2255/20723* (2013.01)

(58) Field of Classification Search
CPC ... B01J 38/66; B01J 23/92; B01J 23/94; B01J 38/48; B01J 38/68; B01J 19/10; B01D 53/8628; B01D 2255/20723; B01D 53/8625; B01D 53/96
See application file for complete search history.

(56) References Cited

U.S. PATENT DOCUMENTS 7,592,283 B2 * 9/2009 Lee .................. B01J 38/60
502/514

FOREIGN PATENT DOCUMENTS

| CN | 106179529 B | * | 9/2018 | .............. B01J 23/30 |
| TW | 200833419 A | | 8/2008 | |

OTHER PUBLICATIONS

Search Report appended to an Office Action, which was issued to Taiwanese counterpart application No. 109131906 by the TIPO dated Jan. 13, 2021 with an English translation thereof (2 pages).

* cited by examiner

*Primary Examiner* — Colin W. Slifka
*Assistant Examiner* — Logan Edward Laclair
(74) *Attorney, Agent, or Firm* — Hamre, Schumann, Mueller & Larson, P.C.

(57) ABSTRACT

A method for regenerating a deactivated denitration catalyst includes steps of preparing a washing fluid including a water-contained liquid and entrained carbon dioxide bubbles, and subjecting the deactivated denitration catalyst to a treatment with the washing fluid. An apparatus for regenerating the deactivated denitration catalyst is also provided.

7 Claims, 2 Drawing Sheets

METHOD AND APPARATUS FOR REGENERATING DEACTIVATED DENITRATION CATALYST

CROSS-REFERENCE TO RELATED APPLICATION

This application claims priority of Taiwanese Invention Patent Application No. 109131906, filed on Sep. 16, 2020.

FIELD

The disclosure relates to a method and an apparatus for regenerating a catalyst, and more particularly to a method and an apparatus for regenerating a deactivated denitration catalyst.

BACKGROUND

Selective catalyst reduction (SCR) catalysts are widely used for decomposing nitrogen oxides ($NO_x$) of waste gases into nitrogen and water so as to meet emission standards. With the passing of time, toxic contaminants or the like may be accumulated on the SCR catalysts, which reduces active areas of the SCR catalysts, and finally deactivates the SCR catalysts.

U.S. Pat. No. 7,592,283 B2 discloses a conventional method for regenerating a honeycomb type SCR catalyst used in an industrial boiler. In the conventional method, a waste honeycomb type SCR catalyst is placed in an air lift loop reactor which generates bubbles having a size of less than 500 μm, and a mixed solution containing 0.1 M to 1.0 M $H_2SO_4$, 0.005 M to 0.1 M $NH_4VO_3$, and 0.005 M to 0.1 M $5(NH_4)_2O \cdot 12WO_3 \cdot 5H_2O$ is circulated in the air lift loop reactor. However, because the mixed solution includes sulfuric acid for removing alkali metal compound that accumulates on the SCR catalyst, the treatment for the waste liquid produced using the conventional method might be relatively complicated.

SUMMARY

Therefore, an object of the disclosure is to provide a novel method for regenerating a deactivated denitration catalyst, which is more environmentally friendly. A novel apparatus for regenerating a deactivated denitration catalyst is also provided.

According to a first aspect of the disclosure, a method for regenerating a deactivated denitration catalyst includes steps of:

a) preparing a washing fluid including a water-containing liquid and entrained carbon dioxide bubbles; and
b) subjecting the deactivated denitration catalyst to a treatment with the washing fluid.

According to a second aspect of the disclosure, an apparatus for regenerating a deactivated denitration catalyst includes a tank, a partition wall, a gas supplying device, and a fluid-providing device. The tank has a bottom wall and a surrounding wall which extends upwardly from an outer periphery of the bottom wall to define an inner space. The partition wall extends upwardly from the bottom wall to partition the inner space into a reservoir chamber for accommodating a water-containing liquid, and a treatment chamber for accommodating the deactivated denitration catalyst and a washing fluid which includes the water-containing liquid and entrained carbon dioxide bubbles. The partition wall is configured to permit an excess of the washing fluid in the treatment chamber to overflow into the reservoir chamber through an upper edge of the partition wall, thereby serving a portion of the water-containing liquid. The gas supplying device is provided for supplying carbon dioxide. The fluid-providing device is coupled to provide the washing fluid to the treatment chamber, and includes a mixer pump which is configured to mix the carbon dioxide from the gas supplying device and the water-containing liquid from the reservoir chamber so as to obtain the washing fluid, thereby permitting the washing fluid to be provided to the treatment chamber.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
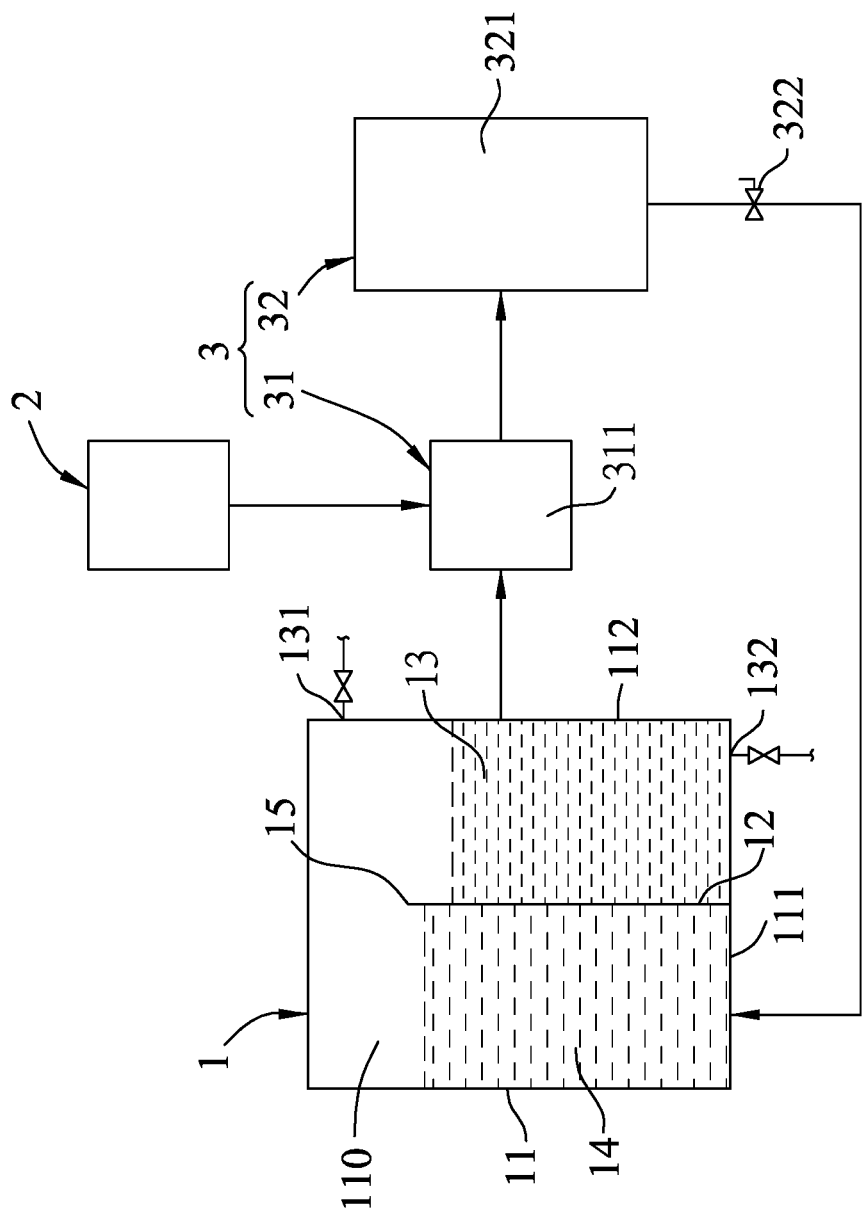
FIG. 1 is a schematic view of an apparatus for regenerating a deactivated denitration catalyst according to an embodiment of the disclosure.

Before the disclosure is described in greater detail, it should be noted that where considered appropriate, reference numerals have been repeated among the figures to indicate corresponding or analogous elements, which may optionally have similar characteristics.

As used herein, a denitration catalyst refers to a catalyst used for a selective catalyst reduction (SCR), and may be a honeycomb type catalyst or a plate type catalyst. A deactivated denitration catalyst may be a denitration catalyst which is fully or partially deactivated.

Referring to FIG. 1, an apparatus for regenerating a deactivated denitration catalyst (not shown) is shown to include a cleaning device 1, a gas supplying device 2, and a fluid-providing device 3.

The cleaning device 1 includes a tank 1 and a partition wall 12. The tank 11 has a bottom wall 111 and a surrounding wall 112 which extends upwardly from an outer periphery of the bottom wall 111 to define an inner space 110. The partition wall 12 extends upwardly from the bottom wall 111 to partition the inner space 110 into a reservoir chamber 13 and a treatment chamber 14. The reservoir chamber 13 is provided for accommodating a water-containing liquid. The treatment chamber 14 is provided for accommodating the deactivated denitration catalyst (not shown) and a washing fluid which includes the water-containing liquid and entrained carbon dioxide bubbles. The partition wall 12 is configured to permit an excess of the washing fluid in the treatment chamber 14 to overflow into the reservoir chamber 13 through an upper edge 15 of the partition wall 12, thereby serving a portion of the water-containing liquid. The washing fluid in the treatment chamber 14 is employed to regenerate the activities of the deactivated denitration catalyst. The toxic contaminants or the like detached from the catalyst may float on the washing fluid and overflow into the reservoir chamber 13. The contaminants detached from the catalyst may be easily removed from the liquid level of the water-containing liquid in the reservoir chamber 13.

In an embodiment shown in FIG. 1, the cleaning device 1 may include an inlet port 131 for introducing a fresh water-containing liquid into the reservoir chamber 13, and an outlet port 132 for discharging the used water-containing liquid in the reservoir chamber 13. Following treatment in the treatment chamber 14, the water-containing liquid in the reservoir chamber 13 may be discharged from the outlet port 132 to a waste liquid treating device (not shown) for further treatment.

The gas supplying device 2 is provided for supplying carbon dioxide.

The fluid-providing device 3 is coupled to provide the washing fluid to the treatment chamber 14, and includes a mixer pump 31 which is configured to mix the carbon dioxide from the gas supplying device 2 and the water-containing liquid from the reservoir chamber 13 so as to obtain the washing fluid, thereby permitting the washing fluid to be provided to the treatment chamber 14. The fluid-providing device 3 is provided for continuous introduction of carbon dioxide to the water-containing liquid for continuous circulation.

In an embodiment shown in FIG. 1, the mixer pump 31 may include a mixing chamber 311 in fluid communication with the gas supplying device 2 and the reservoir chamber 13 so as to permit the carbon dioxide and the water-containing liquid to be mixed in the mixing chamber 311.

In an embodiment shown in FIG. 1, the fluid-providing device 3 may further include a pressurizer 32 which is coupled between the tank 11 and the mixer pump 31 to pressurize the washing fluid from the mixer pump 31, so as to permit the washing fluid, after pressurized, to be provided to the treatment chamber 14.

In an embodiment shown in FIG. 1, the pressurizer 32 may include a pressurizing chamber 321 and a control valve 322. The pressurizing chamber 321 is in fluid communication with the mixing chamber 311 to permit the washing fluid to be pressurized therein. The control valve 322 is provided between the pressurizing chamber 321 and the treatment chamber 14, and is operable to control the pressure of the washing fluid inside the pressurizing chamber 321 so as to permit the entrained carbon dioxide bubbles to have a predetermined average size in the washing fluid.

In other embodiment, the control valve 322 may not be operated to control the size of the entrained carbon dioxide bubbles, and the washing fluid from the mixing chamber 311 may flow through the pressurizing chamber 321 into the treatment chamber 14 without further pressurization. Alternatively, in this case, a pipe (not shown) interconnecting the mixing chamber 311 and the treatment chamber 14 may be provided for introducing the washing liquid directly to the treatment chamber 14.

Figure 2:
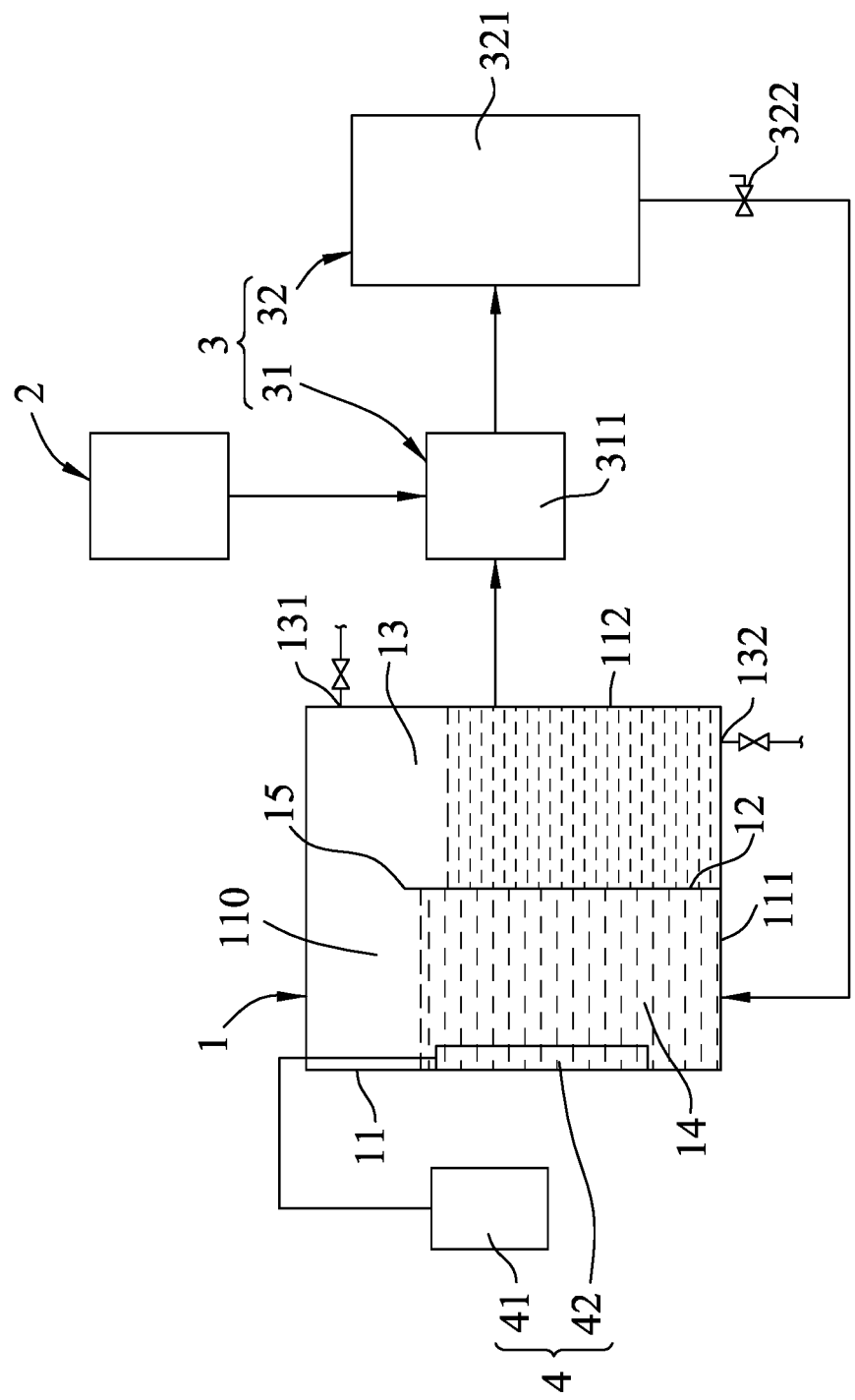
FIG. 2 is a schematic view illustrating a modified embodiment of FIG. 1.

In an embodiment shown in FIG. 2, the apparatus may further include an ultrasonic generating device 4 disposed to permit the deactivated denitration catalyst (not shown), whilst being treated by the washing fluid, to be subjected to an ultrasonic treatment.

In an embodiment shown in FIG. 2, the ultrasonic generating device 4 may include a power supply 41 and an ultrasonic generator 42. The power supply 41 is disposed outside of the tank 11 and is configured to output an electric signal. The ultrasonic generator 42 is disposed in the treatment chamber 14, and is coupled to the power supply 41 so as to convert the electrical signal from the power supply 41 into ultrasonic energy. With the provision of the ultrasonic generating device 4, the contaminants on the catalyst may be more easily detached from the catalyst, thereby further improving the activity of the regenerated catalyst.

A method for regenerating the deactivated denitration catalyst according to an embodiment of the disclosure may be carried out using the above-mentioned apparatus. The method includes steps a) and b).

In step a), the washing fluid is prepared. In step b), the deactivated denitration catalyst is subjected to a treatment with the washing fluid.

In an embodiment, to endow the washing fluid with improved cleaning ability, the washing fluid may be prepared by subjecting a mixture of the water-containing liquid and the entrained carbon dioxide bubbles to a pressure ranging from 1 $kgf/cm^2$ to 8 $kgf/cm^2$ so as to permit the entrained carbon dioxide bubbles to have a predetermined average size. In certain embodiments, the pressure may range from 6 $kgf/cm^2$ to 8 $kgf/cm^2$, and the average size of the entrained carbon dioxide bubbles may be smaller than 50 μm, which is more beneficial for effectively detaching the contaminants from the catalyst.

In an embodiment, the water-containing liquid may include water and an active material. The active material is provided for replenishing active components of the catalyst which were exhausted in the SCR treatment, or were partially eluted during regeneration.

The active material may be selected from the group consisting of vanadium salts, tungsten salts, manganese salts, cerium salts, copper salts, iron salts, and combinations thereof.

In an embodiment, the active material may be a pentavalent vanadium salt.

In an embodiment, the pentavalent vanadium salt may be $NH_4VO_3$.

In an embodiment, the active material in the water-containing liquid may have a concentration ranging from 0.005 M to 0.05 M. The higher the concentration of the active material, the better the activity of the regenerated catalyst. However, when the concentration of the active material is higher than 0.05 M, the improvement of activity thereof is limited. Therefore, when the cost is further taken into consideration, the concentration of the active material may be controlled to be not greater than 0.05 M.

In an embodiment, the method may further include a step c). In step c), the deactivated denitration catalyst is subjected to an ultrasonic treatment whilst implementing step b).

The embodiments of the disclosure will now be explained in more detail below by way of the following examples and comparative examples using the above-mentioned apparatus. Those examples are intended for purposes of illustration only and are not intended to limit the scope of the present disclosure.

Example 1 (EX1)

A water-containing liquid (including 90 L of water only) was warmed to 30° C. and then mixed with carbon dioxide in a liquid-gas ratio of 1.5 (a flow rate of the water-containing liquid was 3 L/min, and a flow rate of carbon dioxide was 2 L/min) so as to form a washing fluid. Thereafter, the washing fluid was pressurized at 1 $kgf/cm^2$, and a deactivated denitration catalyst (honeycomb type, 15 mm×15 mm×50 mm) was treated by the pressurized washing fluid for 30 minutes to obtain a regenerated catalyst.

Example 2 (EX2)

The regenerated catalyst of Example 2 was prepared according to procedures similar to those described in Example 1, except that, in Example 2, the deactivated denitration catalyst was treated with ultrasonic power (1200 watts, 40 kHz) whilst being treated with the washing fluid.

Example 3 (EX3)

The regenerated catalyst of Example 3 was prepared according to procedures similar to those described in Example 1, except that, in Example 3, NH$_4$VO$_3$ was further included in the water-containing liquid so as to have a concentration of 0.01 M.

Example 4 (EX4)

The regenerated catalyst of Example 4 was prepared according to procedures similar to those described in Example 2, except that, in Example 4, NH$_4$VO$_3$ was further included in the water-containing liquid so as to have a concentration of 0.01 M.

Example 5 (EX5)

The regenerated catalyst of Example 5 was prepared according to procedures similar to those described in Example 1, except that, in Example 5, the washing fluid was pressurized at 6 kgf/cm$^2$.

Example 6 (EX6)

The regenerated catalyst of Example 6 was prepared according to procedures similar to those described in Example 3, except that, in Example 6, the washing fluid was pressurized at 6 kgf/cm$^2$.

Example 7 (EX7)

The regenerated catalyst of Example 7 was prepared according to procedures similar to those described in Example 4, except that, in Example 7, the washing fluid was pressurized at 6 kgf/cm$^2$.

Comparative Example 1 (CE1)

The regenerated catalyst of Comparative Example 1 was prepared according to procedures similar to those described in Example 5, except that, in Comparative Example 1, carbon dioxide was not included in the washing fluid.

Comparative Example 2 (CE2)

The regenerated catalyst of Comparative Example 2 was prepared according to procedures similar to those described in Comparative Example 1, except that, in Comparative Example 2, the deactivated denitration catalyst was treated with ultrasonic power (1200 watts, 40 kHz) whilst being treated with the pressurized washing fluid.

Comparative Example 3 (CE3)

The regenerated catalyst of Comparative Example 3 was prepared according to procedures similar to those described in Example 5, except that, in Comparative Example 3, air was used to replace the carbon dioxide in Example 1 so as to mix with the water.

Evaluation—Denitration Efficiency

Denitration efficiency of each of the deactivated and regenerated catalysts of Examples 1 to 7 and Comparative Examples 1 to 3 was evaluated as follow. The catalyst to be measured was disposed in a fixed-bed tubular reactor which had an inner dimension of 50 mm and an inner length of 900 mm, and a test exhaust gas was passed through the fixed-bed tubular reactor at a temperature of 380° C. and a flow rate of 2000 ml/min. The test exhaust gas includes NO (150 ppm), NH$_3$ (150 ppm), O$_2$ (3.3 vol %), and a balance of nitrogen gas. The denitration efficiency (DE) of the catalyst was calculated using the following formula:

$$DE = \frac{A - B}{A} \times 100\%$$

where

A is a concentration of NO at an inlet of the reactor, and
B is a concentration of NO at an outlet of the reactor.

The operating parameters for treating the deactivated denitration catalysts of Examples 1 to 7 and Comparative Examples 1 to CE3, and evaluation results thereof are listed in Table 1.

TABLE 1

| | | EX1 | EX2 | EX3 | EX4 | EX5 | EX6 | EX7 | CE1 | CE2 | CE3 |
|---|---|---|---|---|---|---|---|---|---|---|---|
| Gas | CO$_2$ | 2 | 2 | 2 | 2 | 2 | 2 | 2 | 0 | 0 | 0 |
| (L/min) | Air | 0 | 0 | 0 | 0 | 0 | 0 | 0 | 0 | 0 | 2 |
| Water-contained liquid | Water (L) | 90 | 90 | 90 | 90 | 90 | 90 | 90 | 90 | 90 | 90 |
| | NH$_4$VO$_3$ (M) | 0 | 0 | 0.01 | 0.01 | 0 | 0.01 | 0.01 | 0 | 0 | 0 |
| Pressure (kgf/cm$^2$) | | 1 | 1 | 1 | 1 | 6 | 6 | 6 | 6 | 6 | 6 |
| Ultrasonic Treatment | | x | ○ | x | ○ | x | x | ○ | x | ○ | x |
| DE 1 (%) | | 13.8 | 13.8 | 13.8 | 13.8 | 13.8 | 13.8 | 13.8 | 13.8 | 13.8 | 13.8 |
| DE 2 (%) | | 29.9 | 34.8 | 59.3 | 72.4 | 53.8 | 67.9 | 76.7 | 21.9 | 24.9 | 23.8 |

* "○" represents the catalyst was subjected to an ultrasonic treatment whilst being treated with a washing fluid;
* "x" represents the catalyst was treated using a washing fluid only;
* "DE 1" represents a denitration efficiency of the deactivated catalyst; and
* "DE 2" represents a denitration efficiency of the regenerated catalyst.

The result in Table 1 shows that the regenerated catalysts of Examples 1 to 7 may have better denitration efficiencies in comparison with those of Comparison Examples 1 to 3. This demonstrates that the carbon dioxide bubbles may be useful for facilitating the detachment of contaminants on the catalysts.

In addition, the regenerated catalyst of Example 2, which was obtained by further treatment with ultrasonic energy, has better denitration efficiency than that of Example 1. This demonstrates that the ultrasonic treatment is also useful for facilitating the detachment of contaminants on the catalyst. The same conclusion can be made when the regenerated catalyst of Example 3 is compared with that of Example 4, and also when the regenerated catalyst of Example 6 is compared with that of Example 7.

Furthermore, the regenerated catalyst of Example 5, which was obtained by treatment with carbon dioxide bubbles having a smaller size (i.e., smaller than 50 μm), has better denitration efficiency than that of Example 1. This demonstrates that when the size of the carbon dioxide bubbles is smaller than 50 μm, the contaminants may be more easily detached from the catalyst. The same conclusion can be made when the regenerated catalyst of Example 3 is compared with that of Example 6, and also when the regenerated catalyst of Example 4 is compared with that of Example 7.

In sum, by virtue of the method and apparatus of the disclosure, the deactivated denitration catalyst may be efficiently regenerated to have a good denitration efficiency. In addition, since use of strong acid solution is omitted in the method or the apparatus of the disclosure, the waste liquid produced by the method or the apparatus can be treated in a relatively simple way.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for regenerating a deactivated denitration catalyst, comprising:
   a) preparing a washing fluid including a water-containing liquid and entrained carbon dioxide bubbles; and
   b) subjecting the deactivated denitration catalyst to a treatment with the washing fluid, wherein
      the washing fluid is prepared by mixing the water-containing liquid with a gas consisting essentially of carbon dioxide, and
      the gas is not air.

2. The method according to claim 1, wherein, in a), the washing fluid is prepared by subjecting a mixture of the water-containing liquid and the entrained carbon dioxide bubbles to a pressure ranging from 1 kgf/cm$^2$ to 8 kgf/cm$^2$, so as to permit the entrained carbon dioxide bubbles to have a predetermined average size.

3. The method according to claim 1, wherein the water-containing liquid includes water and an active material selected from the group consisting of vanadium salts, tungsten salts, manganese salts, cerium salts, copper salts, iron salts, and combinations thereof.

4. The method according to claim 3, wherein the active material is a pentavalent vanadium salt.

5. The method according to claim 4, wherein the pentavalent vanadium salt is $NH_4VO_3$.

6. The method according to claim 3, wherein the active material in the water-containing liquid has a concentration ranging from 0.005 M to 0.05 M.

7. The method according to claim 1, further comprising
   c) subjecting the deactivated denitration catalyst to an ultrasonic treatment whilst implementing b).

* * * * *